US007617542B2

(12) United States Patent
Vataja

(10) Patent No.: US 7,617,542 B2
(45) Date of Patent: Nov. 10, 2009

(54) LOCATION-BASED CONTENT PROTECTION

(75) Inventor: Timo Vataja, Tampere (FI)

(73) Assignee: Nokia Corporation, Espoo (FI)

( * ) Notice: Subject to any disclaimer, the term of this patent is extended or adjusted under 35 U.S.C. 154(b) by 775 days.

(21) Appl. No.: 10/024,224

(22) Filed: Dec. 21, 2001

(65) Prior Publication Data

US 2003/0120940 A1    Jun. 26, 2003

(51) Int. Cl.
*H04N 1/417* (2006.01)
*H04N 1/419* (2006.01)
*H04N 7/68* (2006.01)
*H04N 7/30* (2006.01)

(52) U.S. Cl. .................. 726/30; 340/995.28; 342/450; 713/176

(58) Field of Classification Search ............ 380/258, 380/217, 247; 713/175–180; 726/2–5, 16–18, 726/30; 342/450–451, 459; 340/989, 995.28
See application file for complete search history.

(56) References Cited

U.S. PATENT DOCUMENTS

| | | | | |
|---|---|---|---|---|
| 4,860,352 A | * | 8/1989 | Laurance et al. | 380/258 |
| 5,499,294 A | * | 3/1996 | Friedman | 713/179 |
| 5,748,084 A | | 5/1998 | Isikoff | 340/568 |
| 5,794,139 A | * | 8/1998 | Mizikovsky et al. | 455/403 |
| 5,799,082 A | * | 8/1998 | Murphy et al. | 713/179 |
| 5,799,083 A | * | 8/1998 | Brothers et al. | 380/239 |
| 6,125,446 A | | 9/2000 | Olarig et al. | 713/200 |
| 6,144,848 A | | 11/2000 | Walsh et al. | 455/419 |
| 6,282,362 B1 | * | 8/2001 | Murphy et al. | 386/46 |
| 7,003,113 B1 | * | 2/2006 | Yanase | 380/258 |
| 7,024,558 B1 | * | 4/2006 | Satake | 713/176 |
| 7,236,596 B2 | * | 6/2007 | Prokoski | 380/258 |
| 2001/0034204 A1 | * | 10/2001 | Pentikainen | 455/3.05 |
| 2002/0080968 A1 | * | 6/2002 | Olsson | 380/270 |
| 2002/0169539 A1 | * | 11/2002 | Menard et al. | 701/200 |
| 2002/0169966 A1 | * | 11/2002 | Nyman et al. | 713/182 |

OTHER PUBLICATIONS

PCT International Search Report dated Mar. 14, 2003.

* cited by examiner

*Primary Examiner*—Jung Kim
*Assistant Examiner*—Venkat Perungavoor
(74) *Attorney, Agent, or Firm*—Locke Lord Bissell & Liddell LLP

(57) ABSTRACT

A system and system is disclosed to protect media content via location-based data. Multimedia devices are equipped with locator devices, such as a GPS unit, or similar device. The multimedia devices preferably contain the device's International Mobile Equipment Identification (IMEI), and International Mobile Subscriber Identification (IMSI). When multimedia content is created on the multimedia device, such as image or sound files, the present invention encodes the multimedia content with location data from the locator device. Additionally, the multimedia device's IMEI and IMSI, as well as the time and the date, may be encoded onto the multimedia content. Under an alternate embodiment, a remote server performs the encoding of the multimedia content.

52 Claims, 7 Drawing Sheets

LOCATION-BASED CONTENT PROTECTION

BACKGROUND OF THE INVENTION

1. Field of the Invention

The invention disclosed broadly relates to methods for providing location-based content protection, and to encoding content with location-based authenticating data for secure distribution.

2. Background Art

Multimedia content, such as audio, video and photographic images have become more integrated into data communication. As the number of content distributors increase, the need for content data verification will likewise increase. New technologies and business models will allow greater quantities of multimedia content to be distributed from various locations along data communication lines. As users or purchasers obtain the content, there will be a need to efficiently authenticate the origin of the data and protect the content. Thus, the present invention addresses the need by providing location-based protection for multimedia content or data. By providing an easier model for protecting content, content creators will have greater security in releasing content, while content users will have confidence that the content is genuine.

SUMMARY OF THE INVENTION

The present invention discloses a system and method for protecting multimedia content data, such as photographs, video and audio, with location-based data. When a user creates content on a multimedia device, the content is automatically encoded with location-based data. Under an embodiment of the invention, the encoding process is integrated with an electrical switch on the multimedia device (e.g., shutter button). Once the switch is activated, an algorithmic process is executed to encrypt the encoded multimedia content data.

DISCUSSION OF THE INVENTION

Figure 1:
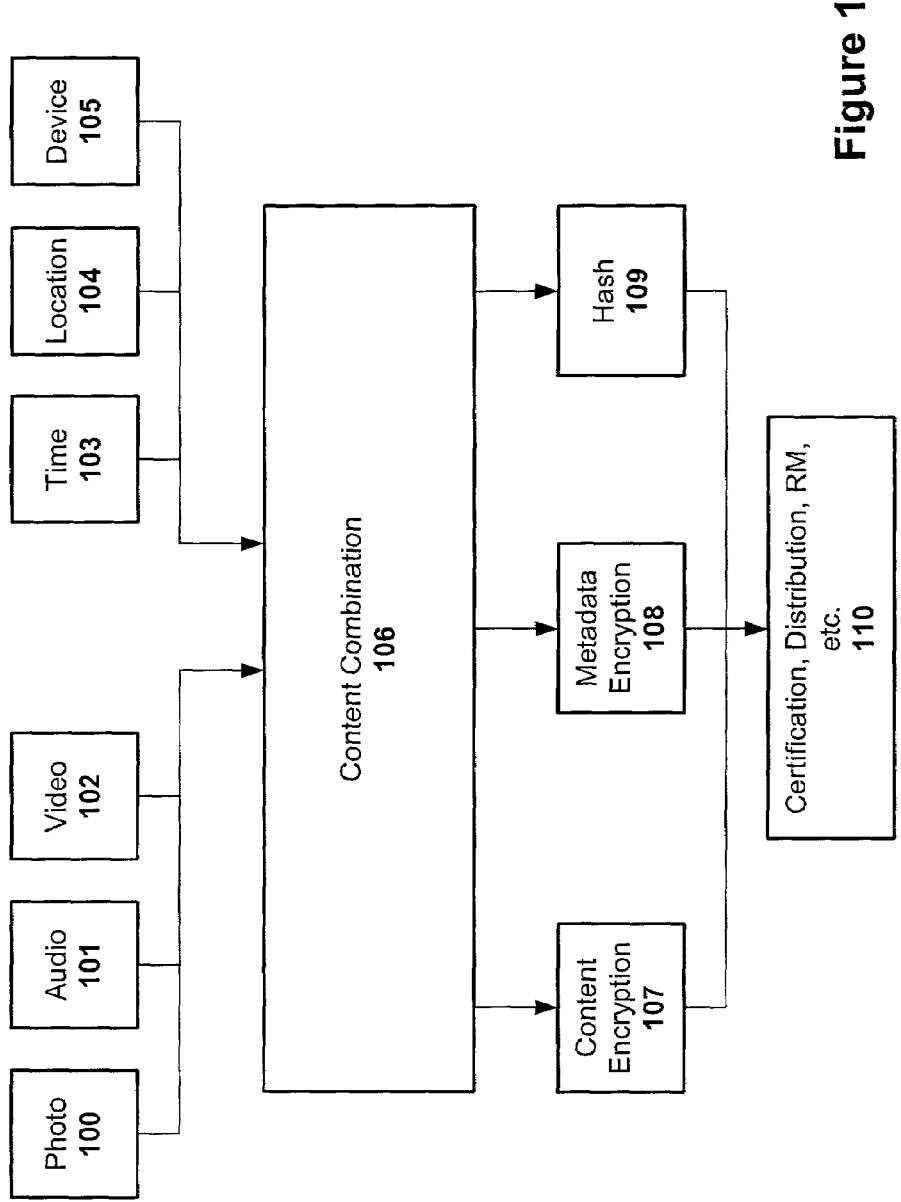
FIG. 1 illustrates a system view of content authentication under an embodiment of the invention.

The invention applies to content-creating devices, such as digital cameras, digital video cameras, digital audio recording devices, and any other devices that allow a user to record visual or audio images, including text and other communicative indicia. These devices may be stand-alone devices, or may be integrated into wireless telephone or PDA devices. FIG. 1 illustrates a system view of content authentication under an embodiment of the invention and how content data is gathered and encrypted. The content data is shown in the format of one or more of the following: photographic pictures 100, audio 101, and video 102. As the content is created alone, or in combination with other content, it is collectively transmitted to the content combination program 106. Time 103, location 104, and device 105 data is also sent to the content combination program 106. The time 103, location 104, and device 105 data may be incorporated as authentication data, provided from trusted sources. The trusted source may be based on identification protocols such as an identified content device and/or user. Under an embodiment of the invention, the identification protocols are automatically embedded into the content metadata (via "one-click" protection, and is shown in greater detail below in FIGS. 3A and 3B. The identification data would include such data as location information and/or data, content creation time, appropriate International Mobile Subscriber Identification (IMSI) and International Mobile Equipment Identification (IMEI) codes. The location data includes Global Positioning System (GPS) coordinates, as well as coordinates established through such systems as Bluetooth™, IEEE 802.11, Wireless LAN (WLAN), HiperLAN. The location data can also be retrieved from a mobile phone network wherein the location is determined based on one or more cells of the network.

Once the content and authentication data is collected in the content combination program 106, the system will now have a sample code of the content along with the authentication data. The system then secures the authentication data to the content through content encryption 107, metadata encryption 108, and/or a "hash" encryption 109, each of which is well-known in the art. Once an encrypted signature based on the authentication data 103, 104, and 105 is integrated into the content file, the file is then transmitted to a Content Certification Company (CCC) 110, or other distributor or Rights Management (RM) provider. The integrated signature then identifies the content owner, along with the location and time in which the content was created. Once the provider 110 stores the content, it can subsequently be made available for trusted distribution.

The network may also be formed as a digital wireless wide area network (WAN), based on architectures such as Global System for Mobile Communication (GSM), IS-136 TDMA-based Digital Advanced Mobile Phone Services (DAMPS), Personal Digital Cellular (PDC), IS-95 CDMA-based "cdma-One" System, General Packet Radio Service (GPRS) and broadband wireless architecture such as W-CDMA and Broadband GPRS. Another alternative includes Digital Video Broadcasting, such as DVB-T. DVB-T is related to DVB-C (cable) and DVB-S (satellite), and is the terrestrial variant of the DVB standard and is a wireless point-to-multipoint data delivery mechanism developed for digital TV broadcasting and based on the MPEG-2 transport stream for the transmission of video and synchronized audio. DVB has the capability of efficiently transmitting large amounts of data over a radio channel to high number of users at a lower cost when compared to data transmission through mobile telecommunication networks using systems such as UMTS/GPRS.

Figure 2:
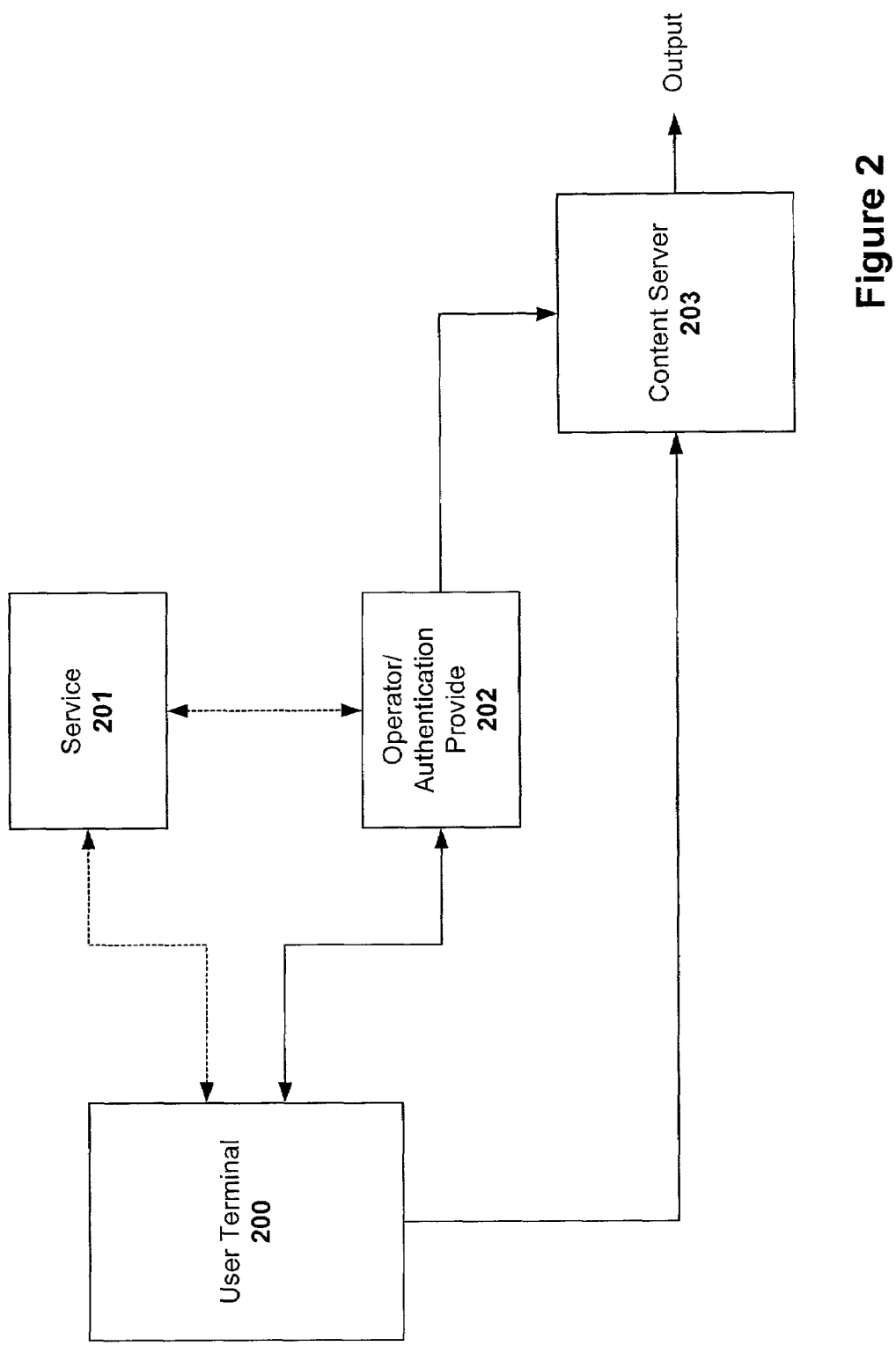
FIG. 2 discloses the transmission of content among the content server and other devices of the present invention.

In another embodiment of the invention, FIG. 2 illustrates the transmission of content data among the content server and other devices. FIG. 2 discloses the transmission of multimedia content to content server 203, which delivers the content to requesting users. The content data is originated from user terminal 200. The user terminals may be equipped with "one-click" protection (see below in FIG. 3A) that would automatically encode the content, and further records of user environment data (e.g., location, time, IMEI, IMSI, Memory Card ID etc.) together with the created content. Under the embodiment of FIG. 2, content from the user terminal is transmitted to content server 203. The user terminal then makes a request for authentication to operator or authentication provider 202.

Authentication provider 202 is set up under the embodiment to facilitate verification the authenticity of the created content by sending authenticating data separately to the content server 203. Once the authentication data is received, content server 203 then links the authentication data to the content created from user terminal 200. Once encrypted, content server 203 transmits the protected content to remote users or subscribers. The request for authentication may also be sent to authentication provider 202 via service provider 201. The content data is processed to prevent or to detect tampering with the content. The content signature (or "hash") can be sent through service provider 201 and then to content server 203 to compare the signature formed there of the received content data. The authentication under the present invention may be accomplished on-line, off-line, or in various combinations. The content and authentication may further be subject to Digital Rights Management (DRM) procedures.

Figure 3A:
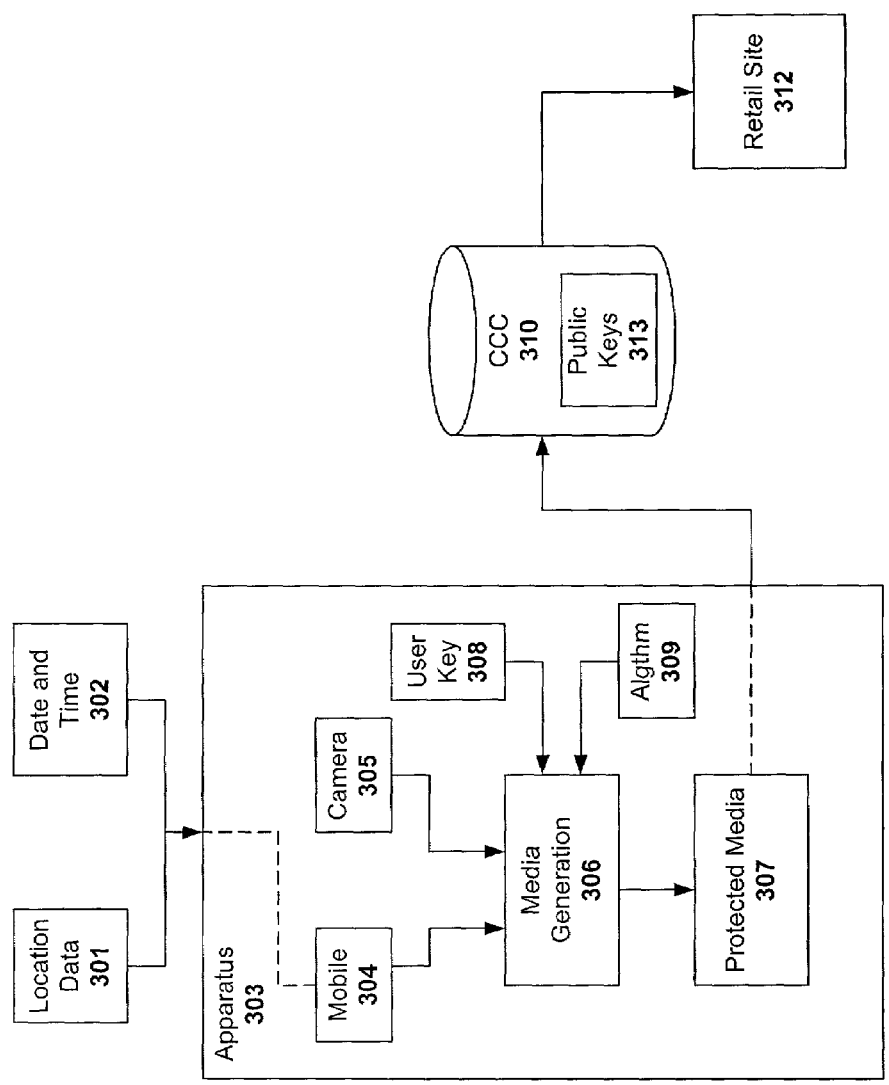
FIG. 3A discloses the creation, encoding and distribution of content with location signatures under an embodiment of the invention.

Another embodiment of the present invention is shown in FIG. 3A. Location data 301 and the date and time 302 are transmitted to multimedia apparatus 303, and is sent to mobile portion or unit 304. The location data 301 and the date and time 302 may be generated from external sources (such as a GPS unit), or may be integrated as a single unit into apparatus 303, with internal location and date/time protocols. Camera 305, or other multimedia audio/visual (A/V) device, initiates the creation of a multimedia file (e.g., video, audio, etc.) that is subsequently transmitted to media generation portion 306 of apparatus 303. Media generation portion 306 algorithmically processes the data into a digital media format, such as JPEG, WAV, AVI, MPEG or other similar formats. At the same time the digital media is being formatted, mobile unit 304 prepares location data 301, date and time data 302, as well as IMEI, IMSI, Memory Card ID or other similar identification information to be encoded to media generation portion 306. A user private key 308 may also be transmitted and encoded to the media for additional encryption protection. An encrypting algorithm 309 utilizes the data from media generation portion 306 and then utilizes location data 301, date and time data 302, as well as identification information such as e.g. the IMEI and IMSI information to encrypt all the data collected in the media generation portion 306. Algorithm 309 may include a "hash" algorithm that is offered by the CCC. Once encrypted, the protected media file 307 is then sent to CCC 310, where it will be stored and subsequently transferred to a requesting retail site 312. CCC 310 may also contain user public keys 313 to decode any users keys 308 that are transmitted with the file.

Figure 3B:
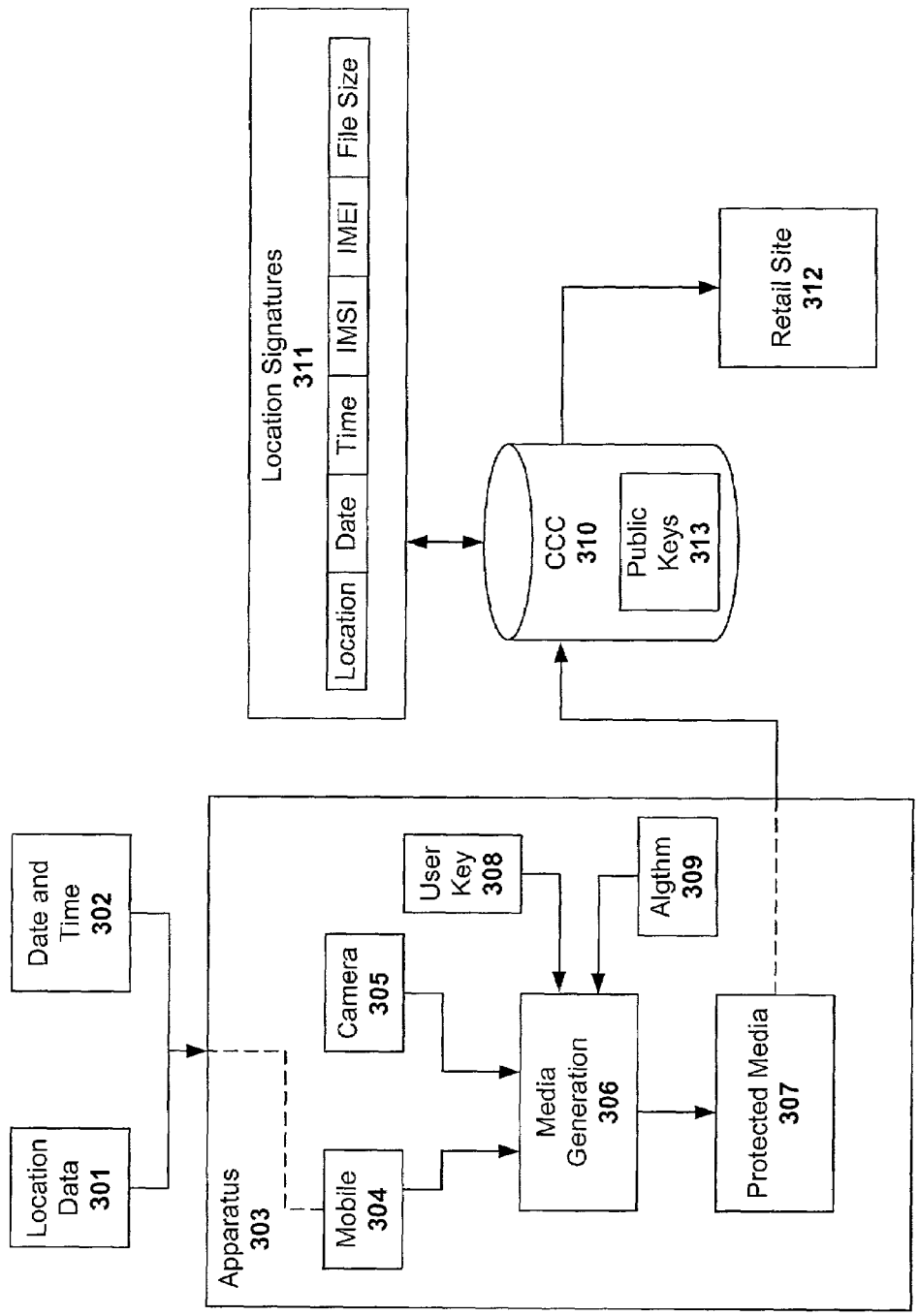
FIG. 3B discloses the creation, encoding and distribution of content with location signatures under another embodiment of the invention.

FIG. 3B discloses another embodiment, where the location data 301 and the date and time 302 are transmitted to multimedia apparatus 303. Location data 301 and the date and time 302 are then stored in mobile portion 304 of apparatus 303. Camera 305, or other multimedia A/V device, provides an initial multimedia file (e.g., video, audio, etc.) that is transmitted to media generation 306 portion of apparatus 303. At the same time, mobile unit 304 transfers location data 301, data and time data 302, as well as identification information such as e.g. IMEI and IMSI information to media generation portion 306. Encryption algorithm 309 is provided to encrypt the information stored in the mobile portion 304, and may be further integrated into a Public Key Infrastructure (PKI) system. Through PKI, user public keys can be managed on a secure basis for distribution systems (e.g., IETF X.509 standard). Once protected media 307 is established, it is forwarded to CCC 310. CCC 310 may also be configured to store public keys 313 of registered users, wherein location signatures 311 are affixed to the media files prior to being sent to any retail sites 312. Location signature 311 would typically include such data as location, date, time, user IMSI and IMEI and file size. Location signature 311 would then electronically "watermark" the content to prevent tampering. It is understood that the public/private key arrangements may be implemented in various ways and combinations under the disclosure of the present invention to allow the encryption/decryption of data.

Figure 4:
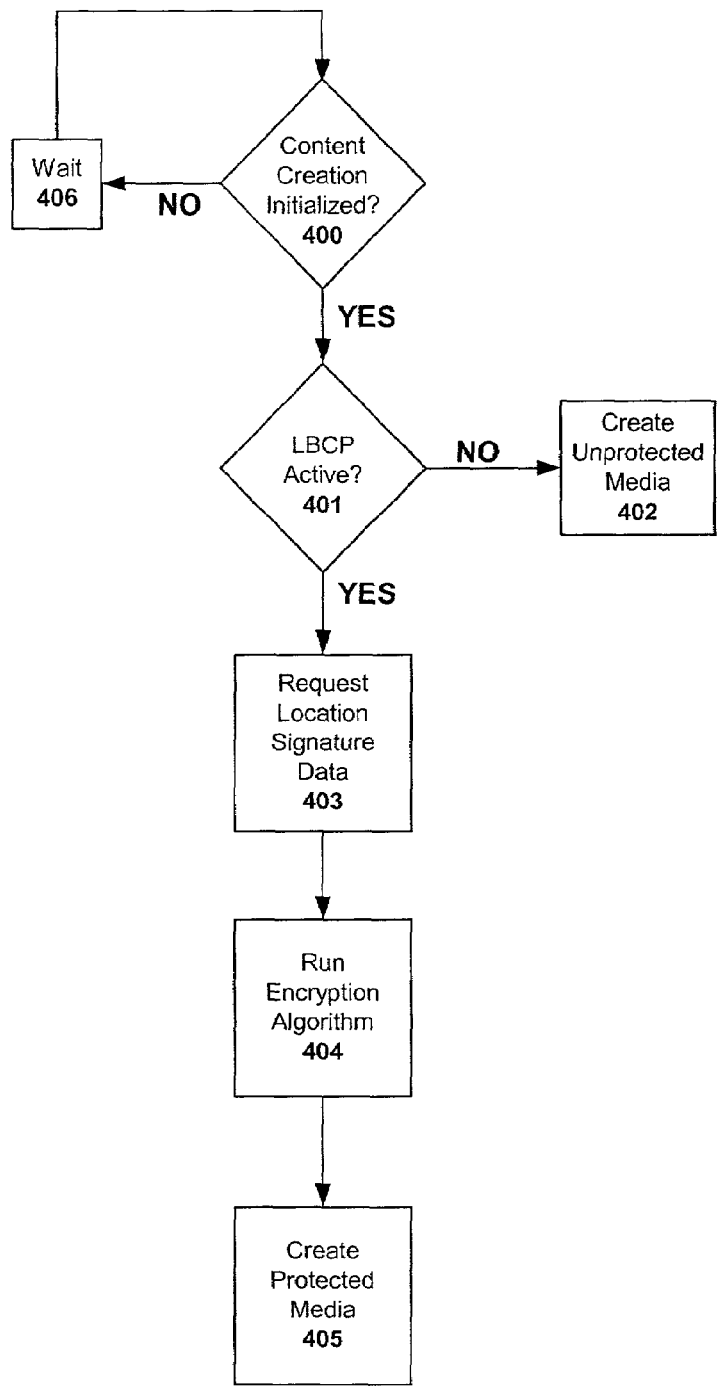
FIG. 4 discloses a method in which protected media is created.

Turning to FIG. 4, the encryption of the media content begins with the initialization of content creation 400. The initialization can occur through the activation of an electrical switch, such as that found on a camera shutter-release, or other media device. If creation of the media has not been initialized, the process waits 406 until content creation has been initialized. Once initiated, the process proceeds to 401, to determine whether Location Based Content Protection (LBCP) is active. If it is not activated, an unprotected media file is created 402. Under alternate embodiments, the LBCP may be automatically integrated into the media device, so that LBCP may be permanently set to an active state. Once the LBCP is set, the process proceeds to request user location signature data 403. Once received, the process runs encryption algorithm 404 to append the location signature data to the media file. Depending on the environment used, the location signature data may be embedded into the file, or may be attached to the file metadata prior to further transmission. Once signature data is encoded, media file is released as a protected media file 405.

Figure 5:
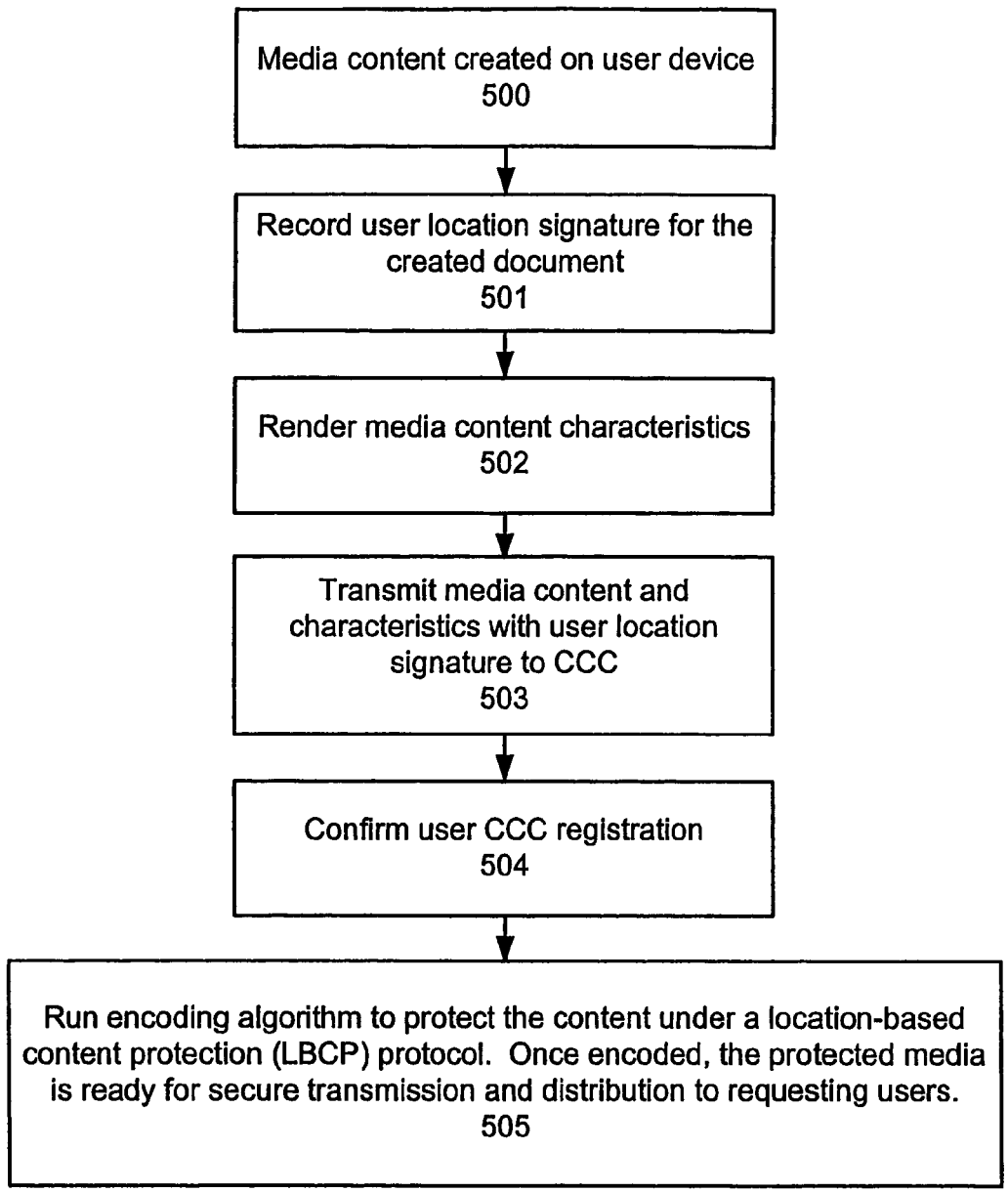
FIG. 5 discloses a method in which content is protected through a Content Certification Company (CCC).

Another embodiment is disclosed in FIG. 5, where a new media file is created in user device 500. Once created, the device automatically records user location signature for created content 501. A signature preferably contains such information as the date and time the content was created, as well as the user location. Furthermore, the user's device will typically possess IMSI and/or IMEI capabilities. Once a signature is established, the process moves to 502, where media content characteristic data (e.g., type of file, size of file, etc.) are rendered. The content characteristics may be further associated associated with the location signature. The media content, content characteristic data and location signature are then transmitted to CCC 503. Under the embodiment of FIG. 5, media and location signature/media characteristic data are sent separately to a CCC. A CCC may be set up so that each user sending multimedia data must be pre-registered as a subscriber. Under this embodiment, the CCC confirm's the user as a subscriber 504, either through a password, or through automatic identification of the user's IMEI/IMSI. The CCC would then run encoding algorithm 505 to protect the content under a location-based content protection (LBCP) protocol. Once encoded, the protected media would be ready for secure transmission and distribution to requesting users.

Figure 6:
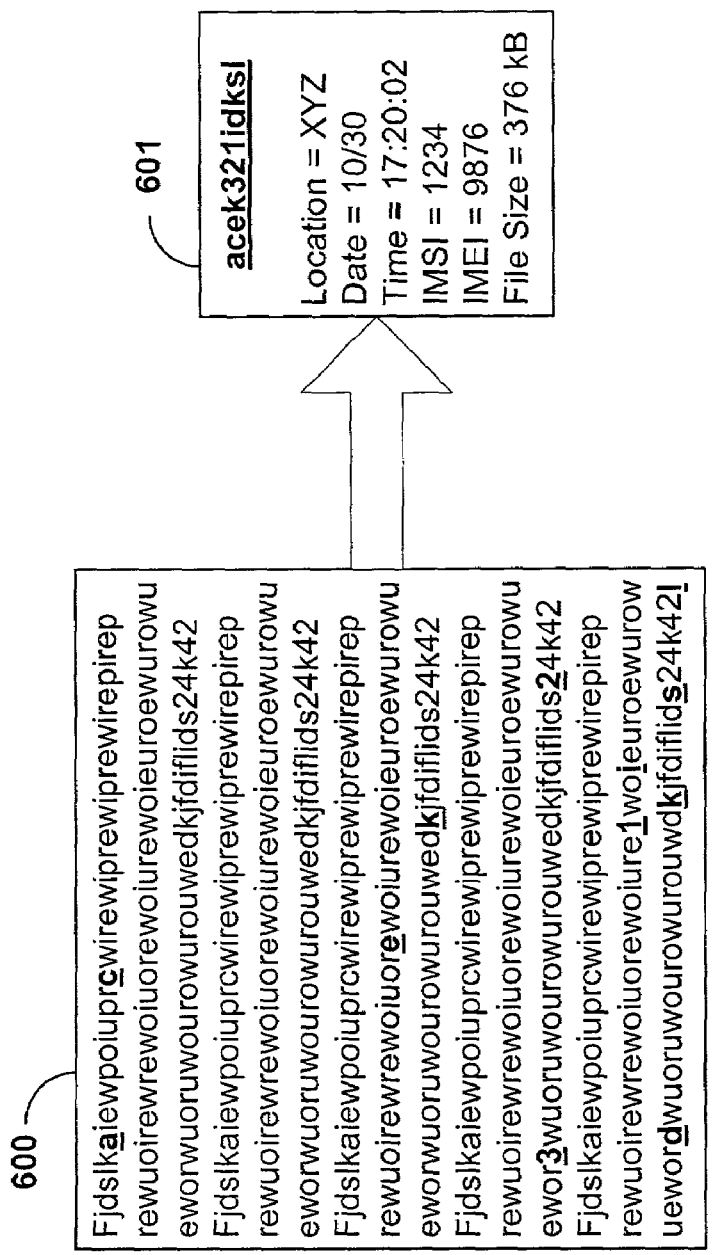
FIG. 6 discloses an example of media encoding under an embodiment of the present invention.

One example of media encoding is given in FIG. 6. In this example the metadata file 601 comprises, in addition to the location signature data such as location, date, time, device and/or user identifying data and file size, also a "hash" signature of content file 600. In the example, the "hash" signature is shown as "acek321idksl", which is created by using an "hash" algorithm. The "hash" signature can be used for detecting any tampering with the content. The "hash" algorithm can be selected from a plurality of algorithms available on the mobile device. An ID for the selected algorithm can be included in the metadata of the content file. The CCC can identify the used algorithm based on the ID and can run a check for identifying any tampering on the content file. In another embodiment of the invention the "hash" algorithm can be applied to the metadata associated with the content and his "hash" is sent to the CCC.

The utilization of location-based protection provides an additional level of verification to media files, and provides additional protection against unauthenticated distribution of digital rights. Under the present invention, if a third party attempts to scan a verified picture, no location data is copied into the file, and the CCC would not accept the file. Also, the CCC could be configured to accept only certified user apparatus and application data, so that fraudulent location/content combinations would not be accepted. CCC's and mobile operators may also make arrangements to have IMEI verification of user locations.

There are a multitude of applications in which the present invention may be used. Content sites can provide a wide spectrum of location based content, from wildlife pictures to news reporting and entertainment. Insurance companies could set up servers where users could effectively transfer protected accident photographs. Police photographs could incorporate the invention to validate photographs taken at traffic intersections or speed traps. The present invention can also be used for reporting of progress in construction or assembling projects. Various games based on "scavenger hunts" could incorporate the technology to create revenue generating or promotional activities for businesses.

An alternate application of the invention the content is delivered through the content server with authentication data to broadcasted programs as a part of the broadcasted program or inserted to e.g. advertisements which are sent in broadcasted transmissions. The authenticated content can be delivered even in real-time.

An alternate application of the invention includes the content-creation devices as being connected to or integrated into mobile communications devices. This way, the devices can be remote-controlled by the user to be used e.g. for monitoring purposes. Still another application of the invention includes a content server for distributing or transmitting the authenticated content to other terminals. The authenticated content can in one embodiment of the invention also be sent to other terminals connected to the network e.g. as a multimedia message such as MMS or other similar message.

Although illustrative embodiments have been described herein in detail, it should be noted and understood that the descriptions and drawings have been provided for purposes of illustration only and that other variations both in form and detail can be made thereupon without departing from the spirit and scope of the invention. The terms and expressions have been used as terms of description and not terms of limitation. There is no limitation to use the terms or expressions to exclude any equivalents of features shown and described or portions thereof.

What is claimed is:

1. A method, comprising:
   determining a current location for a multimedia device using positional information provided by a cellular network or short-range wireless communication medium;
   computing location-based authentication data using the positional information;
   encoding multimedia content created on the multimedia device with said location-based authentication data by computing a hash value on a combined expression of the multimedia content, said location-based authentication data and identification data including at least one of user identification data and device identification data, wherein said encoding creates a content identity key that authenticates the multimedia content as being created at a certain physical location and time; and
   transmitting the encoded multimedia content to a content certification entity via wireless communication, the content certification entity verifying the authenticity of the encoded multimedia content based on the content identity key prior to distribution.

2. The method of claim 1, wherein the location-based authentication data comprises data indicating the physical location of the multimedia device.

3. The method of claim 2, wherein the physical location is determined by Global Positioning System (GPS) coordinates.

4. The method of claim 2, wherein the physical location is determined through a connection to a personal area network.

5. The method of claim 4, wherein the physical location is determined through a connection to a Bluetooth™ terminal.

6. The method of claim 4, wherein the physical location is determined through a connection to a WLAN terminal.

7. The method of claim 4, wherein the physical location is determined through a connection to a mobile phone network.

8. The method of claim 1, wherein the location-based authentication data is date of the content's creation.

9. The method of claim 1, wherein the location-based authentication data is the time of the content's creation.

10. The method of claim 1, wherein the location-based authentication data is the content creator's International Mobile Equipment Identification (IMEI).

11. The method of claim 1, wherein the location-based authentication data is the content creator's International Mobile Subscriber Identification (IMSI).

12. The method of claim 1, wherein the location-based authentication data comprises one or more of the following: the content creator's physical location, date and time of content creation, International Mobile Equipment Identification (IMEI), and International Mobile Subscriber Identification (IMSI).

13. The method of claim 1, wherein the creation of content and encoding are substantially simultaneously executed.

14. An apparatus, comprising:
   a location device, wherein said location device determines a current location for the multimedia device using positional information provided by a cellular network or short-range wireless communication medium;
   a time device, wherein said time device generates data corresponding to the date and time;
   at least one storage medium for storing data identifying the multimedia device and at least one encryption algorithm;
   a media generation switch, wherein said switch initiates the generation of digital multimedia data and further initiates the at least one encryption algorithm to encode said multimedia data with the location data by computing a hash value on a combined expression of the multimedia data, said location data and identification data including at least one of user identification data and device identification data, wherein said encoding creates a content identity key that authenticates the multimedia content as being created at a certain physical location and time; and
   a communication device for transmitting the encoded multimedia content to a content certification entity via wireless communication, the content certification entity verifying the authenticity of the encoded multimedia content based on the content identity key prior to distribution.

15. The apparatus of claim 14, wherein the location device is a Global Positioning System (GPS).

16. The apparatus of claim 14, wherein the location device is a Bluetooth™ terminal.

17. The apparatus of claim 14, wherein the location device is a WLAN terminal.

18. The apparatus of claim 14, wherein the location device establishes location through a Local Area Network (LAN).

19. The apparatus of claim 14, wherein the location device establishes location through a mobile phone network.

20. The apparatus of claim 14, wherein the data identifying the multimedia device comprises of an International Mobile Equipment Identification (IMEI) number.

21. The apparatus of claim 14, wherein the data identifying the multimedia device comprises of an International Mobile Subscriber Information (IMSI) number.

22. The apparatus of claim 14, wherein the at least one encryption algorithm is a hash algorithm.

23. The apparatus of claim 14, wherein the digital multimedia data is image data.

24. The apparatus of claim 14, wherein the digital multimedia is audio data.

25. The apparatus of claim 14, wherein the digital multimedia is video data.

26. A method, comprising:
    determining a current location for a multimedia device using positional information provided by a cellular network or short-range wireless communication medium;
    receiving digital multimedia content created on a multimedia device into a context server through a wireless communication network;
    receiving location-based authentication data computed using the positional information through a network into an authentication server, wherein the location-based authentication data is correlated with the multimedia device that created the multimedia content;
    forwarding the correlated location-based authentication data to the context server; and
    executing an encryption algorithm in the context server, wherein the correlated location-based authentication data is encoded into the multimedia content by computing a hash value on a combined expression of the multimedia content said location-based authentication data and identification data including at least one of user identification data and device identification data, to create a multimedia content identity key that authenticates the multimedia content as being created at a certain physical location and time.

27. The method of claim 26, wherein the digital multimedia content comprises image data.

28. The method of claim 26, wherein the digital multimedia content comprises video data.

29. The method of claim 26, wherein the digital multimedia content comprises audio data.

30. The method of claim 26, wherein the digital multimedia content comprises video and audio data.

31. The method of claim 26, wherein the location-based authentication data comprises data indicating the physical location of the multimedia device.

32. The method of claim 31, wherein the physical location is determined by Global Positioning System (GPS) coordinates.

33. The method of claim 32, wherein the location-based authentication data further comprises the time and date that the content was created.

34. The method of claim 32, wherein the physical location is determined through a connection to a personal area network.

35. The method of claim 34, wherein the physical location is determined through a connection to a Bluetooth™ terminal.

36. The method of claim 31, wherein the location-based authentication data further comprises the time and date that the content was created.

37. The method of claim 31, wherein the location-based authentication data further comprises the International Mobile Equipment Identification (IMEI) of the multimedia device.

38. The method of 31, wherein the location based authentication data further comprises the International Mobile Subscriber Identification (IMSI) of the multimedia device.

39. A system, comprising:
    a storage medium;
    a network interface;
    a processor, coupled to the storage medium and network interface, said processor, storage medium and network interface configured to:
    determining a current location for a multimedia device using positional information provided by a cellular network or short-range wireless communication medium;
    receive digital multimedia content created in the multimedia device into a context server through a wireless communication network;
    receive location-based authentication data computed using the positional information through a network into an authentication server, wherein the location-based authentication data is correlated with the multimedia device that created the multimedia content;
    forward the correlated location-based authentication data to the context server; and
    execute an encryption algorithm in the context server, wherein the correlated location-based authentication data is encoded into the multimedia content by computing a hash value on a combined expression of the multimedia content said location-based authentication data and identification data including at least one of user identification data and device identification data, to create a multimedia content identity key that authenticates the multimedia content as being created at a certain physical location and time.

40. The system of claim 39, wherein the digital multimedia content comprises image data.

41. The system of claim 39, wherein the digital multimedia content comprises video data.

42. The system of claim 39, wherein the digital multimedia content comprises audio data.

43. The system of claim 39, wherein the digital multimedia content comprises video and audio data.

44. The system of claim 39, wherein the location-based authentication data comprises data indicating the physical location of the multimedia device.

45. The system of claim 44, wherein the physical location is determined by Global Positioning System (GPS) coordinates.

46. The system of claim 45 wherein the location-based authentication data further comprises the time and date that the content was created.

47. The system of claim 44, wherein the physical location is determined through a connection to a personal area network.

48. The system of claim 47, wherein the physical location is determined through a connection to a Bluetooth™ terminal.

49. The system of claim 45, wherein the location-based authentication data further comprises the time and date that the content was created.

50. The system of claim 44, wherein the location-based authentication data further comprises the International Mobile Equipment Identification (IMEI) of the multimedia device.

51. The system of claim 44, wherein the location based authentication data further comprises the International Mobile Subscriber Identification (IMSI) of the multimedia device.

52. Computer executable software code stored on a multimedia device, comprising:

code to determine a current location for a multimedia device using positional information provided by a cellular network or short-range wireless communication medium;

code to compute location-based authentication data using the positional information;

code to encode multimedia content created on the multimedia device with said location-based authentication data by computing a hash value on a combined expression of the multimedia content said location-based authentication data and identification data including at least one of user identification data and device identification data, wherein said encoding creates a content identity key that authenticates the multimedia content as being created at a certain physical location and time; and code to transmit the encoded multimedia content to a content certification entity via wireless communication, the content certification entity verifying the authenticity of the encoded multimedia content based on the content identity key prior to distribution.

* * * * *